No. 678,461. Patented July 16, 1901.
W. H. EGAN.
LAWN RAKE.
(Application filed Jan. 17, 1901.)
(No Model.)

Witnesses

Inventor
William H. Egan

UNITED STATES PATENT OFFICE.

WILLIAM H. EGAN, OF GALESBURG, ILLINOIS.

LAWN-RAKE.

SPECIFICATION forming part of Letters Patent No. 678,461, dated July 16, 1901.

Application filed January 17, 1901. Serial No. 43,621. (No model.)

*To all whom it may concern:*

Be it known that I, WILLIAM H. EGAN, a citizen of the United States, residing at Galesburg, in the county of Knox and State of Illinois, have invented certain new and useful Improvements in Lawn-Rakes, of which the following is a specification.

The object of the present invention is to provide a rake of simple construction by which lawns may be raked very much more quickly and more efficiently than is possible with hand-rakes of the kind customarily used for this purpose.

With this end in view the present invention contemplates a rotary rake proper which derives its motion from ground-wheels and a receptacle into which the matter picked up by the rake is delivered and by which such matter is carried until the receptacle is filled.
Where lawn-grass is mowed at frequent intervals and the severed grass-blades are consequently short, it is found desirable to leave it where it is cut to form a mulch, and preferably, though not necessarily, the teeth of my improved rake proper are set at such intervals that they will comb or card the growing grass and will pick up bits of paper, leaves, and other foreign substances of considerable size, while the severed grass-blades will be left.

Figure 1:
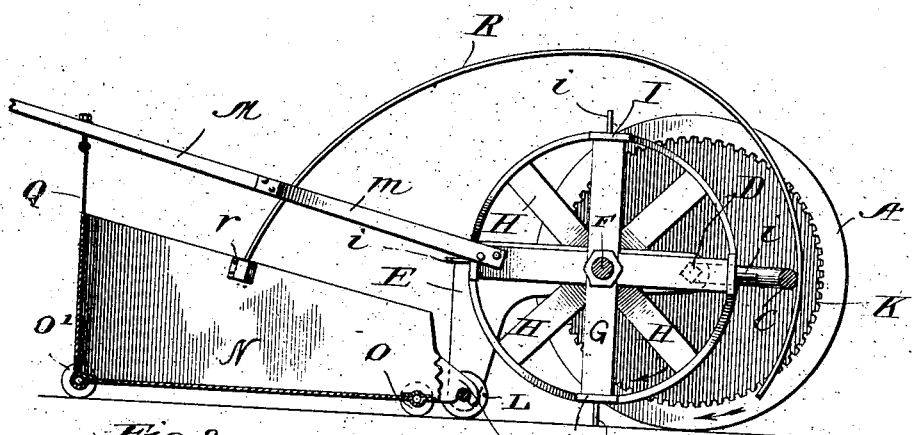
Figure 2:
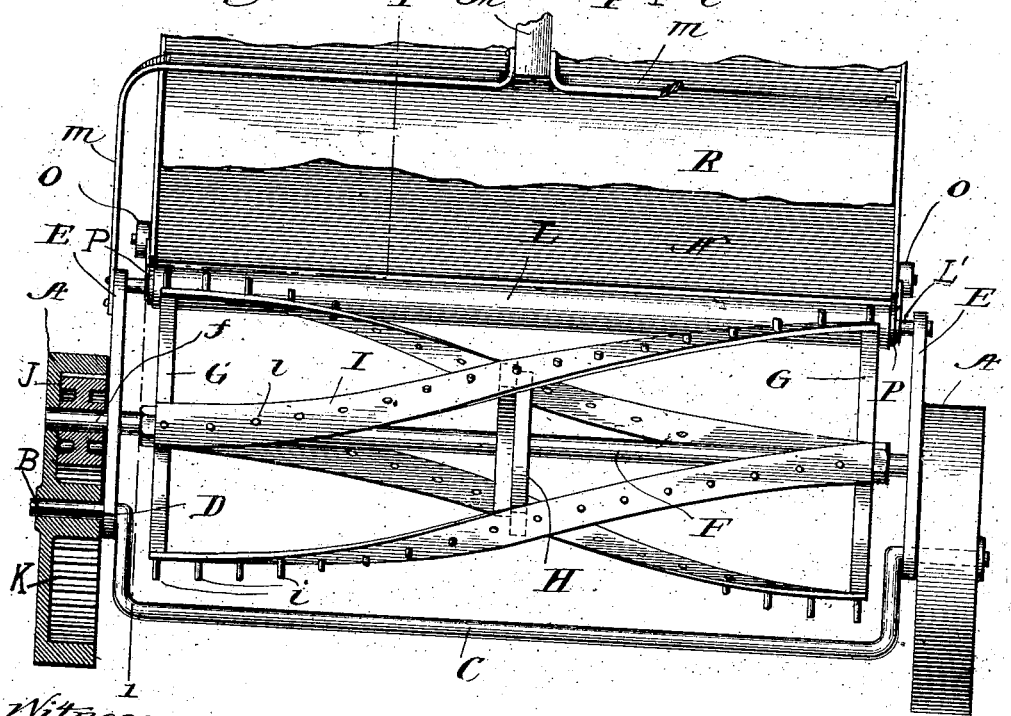

The invention consists in the features of novelty, that are hereinafter described with reference to the accompanying drawings, which are made a part hereof, and in which—
Figure 1 is a sectional elevation of a rake embodying the invention, the section being taken in irregular planes which are approximately represented by the line 1 1, Fig. 2. Fig. 2 is a view thereof looking downward, some of the parts being shown in horizontal section and others being broken away.

A represents the ground-wheels, journaled upon the offset extremities B of a bar or rod C, which has non-circular portions D, occupying corresponding non-circular openings in side plates E, which, together with the offset bar C, constitute the frame of the machine. The object of the non-circular portions D fitting corresponding openings in the plates E is to prevent the bar C from rotating, and the object in forming the bar C with an offset is to avoid the necessity for using ground-wheels of objectionably large diameter, while at the same time permitting the use of a rotary rake of sufficiently large diameter to insure good results. The rake, as here shown, consists of a shaft F, having at each of its ends four equidistant spokes G and having at its center four equidistant spokes H, the spokes G at opposite ends of the shaft being arranged in corresponding radial positions, while the intermediate spokes H occupy intervening radial positions, forming equal angles with the spokes G. The spokes support four spirally-disposed and slightly-twisted bars I, carrying teeth $i$. The shaft F is journaled in and projects beyond the plates E, and to its projecting ends $f$ are secured pinions J, meshing with internal gears K, carried by the ground-wheels A, said pinions J having contact with the gears K upon the rear side of the axes of the ground-wheels A. The plates E are of substantially L shape, one branch of each plate being horizontal, or practically so, and the other branch being vertical, or practically so, and extending downward from the horizontal branch nearly to the ground. Near the lower extremities of these vertical branches of the plates E is journaled a ground-roller L, which supports the rear side of the frame and maintains the proper relation between the ground and the teeth of the rake.

M is a propelling pole or handle, the forward portion of which is bifurcated and has its extremities $m$ secured to the plates, respectively.

N is a receptacle for receiving the matter thrown up by the rake. It is preferably provided near its forward part with ground-rollers O and near its rear part with ground-rollers O', and its sides are provided with forwardly-extending projections P, that are pivotally mounted upon the extended ends of the shaft L' of the roller L. As an additional means for supporting the rear portion of the receptacle N it may be connected to the pole M by means of a chain or other device Q, which enables it to be lifted for dumping and other purposes.

R is a shield, preferably of sheet metal, the rear edge of which is connected to the sides of the receptacle N, as shown at $r$, whence it proceeds forward and upward and thence forward and downward, so that it completely covers the rake and compels matter thrown up by the rake to fall into the receptacle.

The above-described open construction of what might be termed the "frame" and "casing" of my improved rake is advantageous, since it allows ready access not only to the forward part of the receptacle, but also to all of the working parts of the machine, thus making it convenient to reach them for cleaning or repair purposes.

Having described my invention, what I claim as new therein, and desire to secure by Letters Patent, is—

1. A lawn-rake having, in combination, a pair of ground-wheels, a frame comprising a pair of side plates, and a rod having offset ends, said plates having non-circular openings and said rod having non-circular portions occupying said openings and having also, beyond said non-circular portions, extended portions upon which the ground-wheels are journaled, a rotary rake having a shaft journaled in said side plates, a pinion carried by said shaft, and an internal gear carried by the ground-wheels and meshing with the pinion, substantially as set forth.

2. A lawn-rake having, in combination, a pair of ground-wheels, a frame supported thereby and comprising a pair of L-shaped side plates and a rod connecting them, a rotary rake journaled in the horizontal arms of the side plates, a pinion carried by the rake, an internal gear carried by the ground-wheel and meshing with the pinion, a ground-roller journaled in the depending portions of the L-shaped side plates, a receptacle having its forward portion connected to the depending portions of the side plates, means for supporting the rear portion of the receptacle, and a propelling-pole, substantially as set forth.

WILLIAM H. EGAN.

Witnesses:
KATHLEEN C. SLATTERY,
ADDIE F. WILLIAMSON.